United States Patent
Lin

(10) Patent No.: US 12,538,359 B2
(45) Date of Patent: Jan. 27, 2026

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventor: Hao Lin, Neuilly-sur-Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 302 days.

(21) Appl. No.: 18/349,078

(22) Filed: Jul. 7, 2023

(65) Prior Publication Data
US 2023/0354430 A1    Nov. 2, 2023

Related U.S. Application Data

(63) Continuation of application No. PCT/IB2021/000052, filed on Jan. 8, 2021.

(51) Int. Cl.
*H04W 74/0816* (2024.01)
*H04W 74/0833* (2024.01)

(52) U.S. Cl.
CPC ... *H04W 74/0816* (2013.01); *H04W 74/0833* (2013.01)

(58) Field of Classification Search
CPC ......... H04W 74/0816; H04W 74/0808; H04W 74/0833; H04W 74/0836; H04W 74/006;
(Continued)

(56) References Cited

U.S. PATENT DOCUMENTS

2012/0129562 A1*  5/2012  Stamoulis ............. H04W 76/14
                                                       455/517
2014/0185481 A1*  7/2014  Seol ...................... H04W 52/24
                                                       370/252
(Continued)

FOREIGN PATENT DOCUMENTS

WO   WO-2022030826 A1 *  2/2022  ............ H04W 72/23

OTHER PUBLICATIONS

Huawei et al: "Channel access mechanism for 60 GHz unlicensed operation", 3GPP Draft; R1-2008976, 3rd Generation Partnership Project (3GPP), Mobile Competence Centre; 650, Route Deslucioles; F-06921 Sophia-Antipolis Cedex; France vol. RAN WG1, No. E-meeting; 202010262020111323 Oct. 2020 (Oct. 23, 2020), XP051945446, Retrieved from the Internet: URL: https://ftp.3gpp.org/tsg_ran/WG1_RL1/TSGR1_103-e/Docs/R1-2008976.zip[retrieved on Oct. 23, 2020]. 14 pages.
(Continued)

*Primary Examiner* — Mohamed A Kamara
(74) *Attorney, Agent, or Firm* — PERKINS COIE LLP

(57) ABSTRACT

An apparatus and a method of wireless communication are provided. The method by a user equipment (UE) includes performing, by the UE, a channel access procedure using an energy detection threshold (EDT) for a transmission, wherein the EDT is obtained from at least one of the followings: an initial value, a bandwidth (BW) scaling factor, a first offset, or a second offset. This can solve issues in the prior art, reduce signaling overhead, provide an energy detection threshold (ED threshold or EDT) calculation, provide a good communication performance, and/or provide high reliability.

19 Claims, 4 Drawing Sheets

300

302 — Performing, by the base station, a channel access procedure using an energy detection threshold (EDT) for a transmission, wherein the EDT is obtained from at least one of the followings: an initial value, a bandwidth (BW) scaling factor, a first offset, or a second offset

(58) Field of Classification Search
CPC .. H04W 16/14; H04L 27/0006; H04B 17/309; H04B 17/382
See application file for complete search history.

(56) References Cited

U.S. PATENT DOCUMENTS

| | | | |
|---|---|---|---|
| 2017/0273109 A1 | 9/2017 | Babaei et al. | |
| 2019/0230706 A1 | 7/2019 | Li | |
| 2021/0153249 A1 | 5/2021 | Li | |
| 2022/0338247 A1* | 10/2022 | Hedayat | H04W 74/0808 |
| 2023/0156786 A1* | 5/2023 | Myung | H04W 74/0808 |
| | | | 370/329 |

OTHER PUBLICATIONS

Lagen Sandra et al: "New Radio Beam-Based Access to Unlicensed Spectrum: Design Challenges and Solutions", IEEE Communications Surveys & Tutorials, IEEE, USA, vol. 22, No. 1,Oct. 23, 2019 (Oct. 23, 2019), pp. 8-37,XP011778013,DOI: 10.1109/COMST. 2019.2949145[retrieved on Mar. 9, 2020]. 31 pages.

Ericsson: "Channel Access Mechanism", 3GPP Draft; R1-2003850, 3rd Generation Partnership Project (3GPP), Mobile Competence Centre; 650, Route Deslucioles; F-06921 Sophia-Antipolis Cedex ; France vol. RAN WG1, No. e-Meeting; 2020052520200060516 May 2020 (May 16, 2020), XP051885619, Retrieved from the Internet: URL: https://ftp.3gpp.org/tsg_ran/WG1_RL1/TSGR1_101-e/Docs/R1-2003850.zip [retrieved on May 16, 2020]. 12 pages.

International Search Report in the international application No. PCT/IB2021/000052, mailed on Dec. 23, 2021. 5 pages.

Written Opinion of the International Search Authority in the international application No. PCT/IB2021/000052, mailed on Dec. 23, 2021. 12 pages.

"3rd Generation Partnership Project; Technical Specification Group Radio Access Network;Study on supporting NR from 52.6 GHz to 71 GHz (Release 17)", 3GPP TR 38.808 V0.2.0 (Nov. 2020). 161 pages.

First Office Action of the European application No. 21718640.2, issued on Aug. 20, 2025.

* cited by examiner

APPARATUS AND METHOD OF WIRELESS COMMUNICATION

CROSS-REFERENCE TO RELATED APPLICATION

This application is a continuation of International Application No. PCT/IB2021/000052 filed on Jan. 8, 2021, the disclosure of which is hereby incorporated by reference in its entirety.

BACKGROUND

An unlicensed spectrum is a shared spectrum. A communication device in different communication systems can use the unlicensed spectrum as long as the communication device meets regulatory requirements set by the country or region on the unlicensed spectrum and does not need to apply for a proprietary spectrum authorization from the government.

In order to allow various communication systems that use the unlicensed spectrum for wireless communication to coexist friendly in the unlicensed spectrum, some countries or regions specify regulatory requirements that must be met to use the unlicensed spectrum. For example, the communication device follows the principle of "a channel access procedure (or called a listen before talk (LBT) procedure", that is, the communication device needs to perform channel sensing before transmitting a signal on the channel. Only when the LBT outcome shows that the channel is idle, the communication device can perform signal transmission, or otherwise, the communication device cannot perform the signal transmission. In order to ensure fairness, once the communication device successfully occupies the channel, a transmission duration cannot exceed the maximum channel occupancy time (MCOT). The LBT mechanism is also called channel access procedure. In a new radio (NR) release 16 (R16), there are different types of channel access procedures, e.g. type 1, type 2A, type 2B, and type 2C channel access procedures as described in a third generation partnership project (3GPP) technical specification (TS) 37.213.

When performing the channel access procedure, the communication device needs to detect energy of the channel. When the detected energy is beyond a threshold, the channel is deemed as busy, otherwise the channel is idle or empty. This threshold is also called energy detection threshold (ED threshold or EDT). However, how to calculation of the ED threshold is still an open issue.

Therefore, there is a need for an apparatus (such as a user equipment (UE) and/or a base station) and a method of wireless communication, which can solve issues in the prior art, reduce signaling overhead, provide an energy detection threshold (ED threshold or EDT) calculation, provide a good communication performance, and/or provide high reliability.

SUMMARY

The present disclosure relates to the field of communication systems, and more particularly, to an apparatus and a method of wireless communication, which can provide a good communication performance and/or high reliability.

An object of the present disclosure is to propose an apparatus (such as a user equipment (UE) and/or a base station) and a method of wireless communication, which can solve issues in the prior art, reduce signaling overhead, provide an energy detection threshold (ED threshold or EDT) calculation, provide a good communication performance, and/or provide high reliability.

In a first aspect of the present disclosure, a method of wireless communication by a user equipment (UE), comprising performing, by the UE, a channel access procedure using an energy detection threshold (EDT), for a transmission wherein the EDT is obtained from at least one of the followings: an initial value, a bandwidth (BW) scaling factor, a first offset, or a second offset.

In a second aspect of the present disclosure, a method of wireless communication by a base station comprising performing, by the base station, a channel access procedure using an energy detection threshold (EDT) for a transmission, wherein the EDT is obtained from at least one of the followings: an initial value, a bandwidth (BW) scaling factor, a first offset, or a second offset.

In a third aspect of the present disclosure, a user equipment comprises a memory, a transceiver, and a processor coupled to the memory and the transceiver. The processor is configured to perform an uplink (UL) channel access procedure using an energy detection threshold (EDT), wherein the EDT is obtained from at least one of the followings: an initial value, a bandwidth (BW) scaling factor, a first offset, or a second offset.

In a fourth aspect of the present disclosure, a base station comprises a memory, a transceiver, and a processor coupled to the memory and the transceiver. The processor is configured to perform a downlink (DL) access procedure or an uplink (UL) channel access procedure using an energy detection threshold (EDT), wherein the EDT is obtained from at least one of the followings: an initial value, a bandwidth (BW) scaling factor, a first offset, or a second offset.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
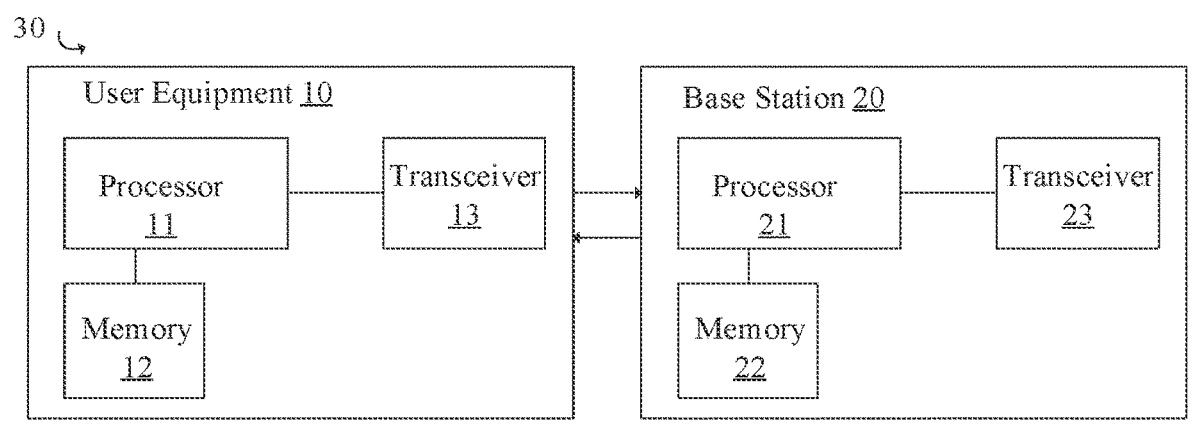
FIG. 1 is a block diagram of one or more user equipments (UEs) and a base station (e.g., gNB or eNB) of communication in a communication network system according to an embodiment of the present disclosure.

FIG. 1 illustrates that, in some embodiments, one or more user equipments (UEs) 10 and a base station (e.g., gNB or eNB) 20 for transmission adjustment in a communication network system 30 (e.g., non-terrestrial network (NTN) or terrestrial network) according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

When moving for high frequency operation, e.g. above 52.6 GHz, beam-forming technique is used to concentrate a transmission power or energy to a specific direction, such that a coverage limitation due to high path loss of a high frequency radio propagation can be compensated for. On the other hand, up to now energy detection threshold (ED threshold or EDT), calculation of the ED threshold is still an open issue, and calculation according to TS 37.213, also does not factor in the beam-forming transmission. In the present disclosure, some embodiments of the present disclosure provide a method for ED threshold calculation for high frequency operation in a shared spectrum case.

In some embodiments, the processor 11 is configured to perform a channel access procedure using an energy detection threshold (EDT) for a transmission, wherein the EDT is obtained from at least one of the followings: an initial value, a bandwidth (BW) scaling factor, a first offset, or a second offset. This can solve issues in the prior art, reduce signaling overhead, provide an energy detection threshold (ED threshold or EDT) calculation, provide a good communication performance, and/or provide high reliability.

In some embodiments, the processor 21 is configured to perform a channel access procedure using an energy detection threshold (EDT) for a transmission, wherein the EDT is obtained from at least one of the followings: an initial value, a bandwidth (BW) scaling factor, a first offset, or a second offset. This can solve issues in the prior art, reduce signaling overhead, provide an energy detection threshold (ED threshold or EDT) calculation, provide a good communication performance, and/or provide high reliability.

Figure 2:
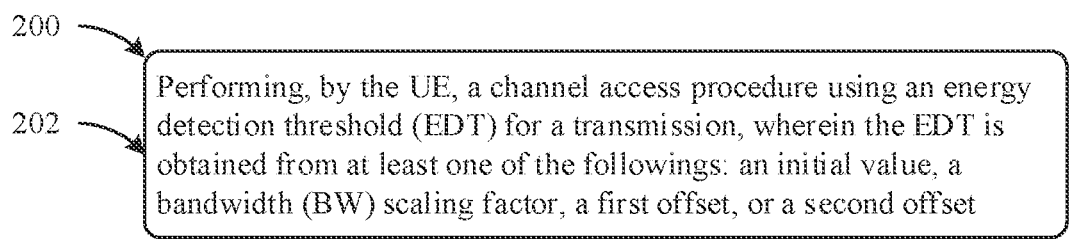
FIG. 2 is a flowchart illustrating a method of wireless communication performed by a user equipment (UE) according to an embodiment of the present disclosure.

FIG. 2 illustrates a method 200 of wireless communication by a user equipment (UE) according to an embodiment of the present disclosure. In some embodiments, the method 200 includes: a block 202, performing, by the UE, a channel access procedure using an energy detection threshold (EDT) for a transmission, wherein the EDT is obtained from at least one of the followings: an initial value, a bandwidth (BW) scaling factor, a first offset, or a second offset. This can solve issues in the prior art, reduce signaling overhead, provide an energy detection threshold (ED threshold or EDT) calculation, provide a good communication performance, and/or provide high reliability.

Figure 3:
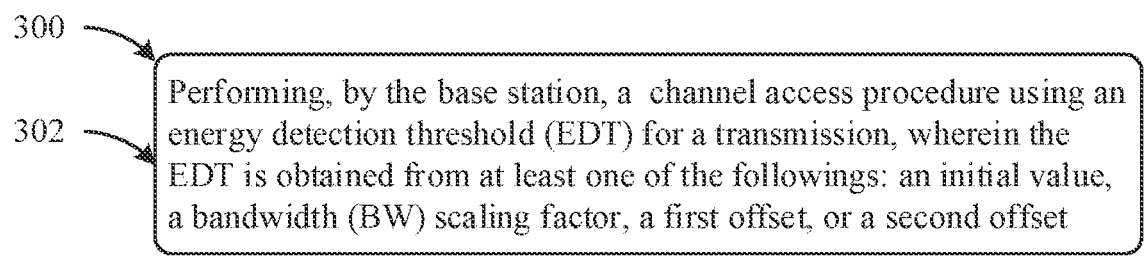
FIG. 3 is a flowchart illustrating a method of wireless communication performed by a base station according to an embodiment of the present disclosure.

FIG. 3 illustrates a method 300 of wireless communication by a base station according to an embodiment of the present disclosure. In some embodiments, the method 300 includes: a block 302, performing, by the base station, a channel access procedure using an energy detection threshold (EDT) for a transmission, wherein the EDT is obtained from at least one of the followings: an initial value, a bandwidth (BW) scaling factor, a first offset, or a second offset. This can solve issues in the prior art, reduce signaling overhead, provide an energy detection threshold (ED threshold or EDT) calculation, provide a good communication performance, and/or provide high reliability.

In some embodiments, the UE is indicated by a base station to perform the transmission. In some embodiments, the UL channel access procedure comprises a type 2A channel access procedure, a type 2B channel access procedure, or a type 2C channel access procedure. In some embodiments, the initial value is in dBm. In some embodiments, the initial value is pre-configured or pre-defined. In some embodiments, the initial value is set to a first value. In some embodiments, the initial value is set to a first value plus or minus a backoff value. In some embodiments, the first value is equal to −47 dBm. In some embodiments, the backoff value is in dB. In some embodiments, the initial value is relevant to at least one of the followings: a power spectrum density (PSD) or a bandwidth (BW).

In some embodiments, the initial value is obtained by $10*\log_{10}(PSD*BW)$, where the PSD comprises a PSD value in mW/MHz and the BW comprises a listen before talk (LBT) BW or channel access BW or nominal channel BW in MHz. In some embodiments, the PSD value is pre-defined or pre-configured. In some embodiments, the BW is pre-configured or pre-defined. In some embodiments, the BW scaling factor is in dB. In some embodiments, the BW scaling factor is relevant to a first BW and a second BW. In some embodiments, the first BW is a BW of a channel in which the UE performs channel access, a carrier BW, or a BW of a transmission that the UE performs in the channel. In some embodiments, the first BW is configured by the base station or configured in at least one of the followings: a system information, a radio resource control (RRC) message, a medium access control (MAC) control element (CE), or a downlink control information (DCI). In some embodiments, the first BW is a pre-defined BW. In some embodiments, the second BW is an LBT BW or a nominal channel BW. In some embodiments, the second BW is configured by the base station or reported by the UE.

In some embodiments, the UE is configured to report one or more BWs to the base station, and the base station is configured to configure one BW as the second BW among the reported one or more BWs from the UE. In some embodiments, the UE is configured to report a maximum BW to the base station, and the base station is configured to configure a BW smaller or equal to the reported maximum BW. In some embodiments, the second BW is configured by the base station or configured in at least one of the followings: a system information, a radio resource control (RRC) message, a medium access control (MAC) control element (CE), or a downlink control information (DCI). In some embodiments, the second BW is a pre-defined BW. In some embodiments, the BW scaling factor is relevant to a ratio between the first BW and the second BW. In some embodiments, the BW scaling factor is equal to $$10 * \log_{10}\left(\frac{BW1}{BW2}\right),$$

where BW1 is the first BW, and BW2 is the second BW. In some embodiments, the first offset is a transmit power offset of the UE or a transmit power offset of the base station. In some embodiments, the first offset is in dB.

In some embodiments, the first offset is obtained from P1 and/or P2, where P1 is a pre-defined power value in dBm and P2 is a maximum transmit power or output power at the base station in dBm for a channel or P2 is a maximum pre-configured or pre-defined transmit power for the UE in dBm. In some embodiments, the first offset is a power difference between P1 and P2. In some embodiments, the first offset is pre-configured or pre-defined. In some embodiments, the second offset comprises a processing gain offset in dB. In some embodiments, a processing gain of the processing gain offset comprises a beamforming gain, wherein the beamforming gain is relevant to a number of antennas at the base station or the UE. In some embodiments, the antennas comprise transmitter antennas or receiver antennas. In some embodiments, the second offset is obtained from G1 and/or G2, where G1 is a first processing gain and G2 is a first processing gain. In some embodiments, the second offset is obtained from a difference between G1 and G. In some embodiments, G1 is in dBi and a value of G1 is pre-configured or pre-defined. In some embodiments, G2 is in dBi and a value of G2 is relevant to a beamforming gain at the base station or the UE.

In some embodiments, the beamforming gain at the UE is pre-configured by the base station. In some embodiments, the beamforming gain at the UE is relevant to a number of the antennas at the UE. In some embodiments, the beamforming gain is obtained by $10*\log_{10}(N)$, where N is the number of the antennas. In some embodiments, the number of the antennas is pre-defined or pre-configured by the base station. In some embodiments, the beamforming gain at the base station is a maximum beamforming gain at the base station. In some embodiments, $$EDT = X - A + G1 - G2 + P1 - P2 + 10*\log_{10}\left(\frac{BW1}{BW2}\right),$$

where X is the first value in dBm and

A is the backoff value in dB, X-A is the initial value. In some embodiments, the backoff value has the following relationship: A=max(G1-G2)+max(P1-P2), where max(G1-G2) is the maximum difference between G1 and G2, and max(P1-P2) is the maximum difference between P1 and P2.

In some embodiments, the EDT is limited by a maximum value and/or a minimum value. In some embodiments, when the EDT is larger than the maximum value, the EDT is set to the maximum value. In some embodiments, when the EDT is smaller than the minimum value, the EDT is set to the minimum value. In some embodiments, the maximum value is obtained from at least one of the followings: the initial value, the value of the PSD, or the BW scaling factor. In some embodiments, the maximum value is equal to the initial value. In some embodiments, the minimum value is obtained from at least one of the followings: a first amount, the maximum value, the initial value, the BW scaling factor, or the backoff value. In some embodiments, the minimum value is obtained by the maximum value minus the first amount. In some embodiments, the first amount is in dB. In some embodiments, the first amount comprises an offset. In some embodiments, the first amount is pre-configured or pre-defined. In some embodiments, $$\text{Min value} = X - A + 10*\log_{10}\left(\frac{BW1}{BW2}\right).$$

In some embodiments, the UE supports different BW values. In some embodiments, the BW values are relevant to a subcarrier spacing (SCS). In some embodiments, the SCS comprises at least one of the followings: 120 kHz, 240 kHz, 480 kHz, or 960 kHz. In some embodiments, when the UE supports a given BW for a given SCS value, the UE is configured with a maximum number of resource blocks (RBs) in a BWP. In some embodiments, the given BW comprises at least one of the followings: 50 MHz, 100 MHz, 200 MHz, 400 MHz, 800 MHz, 1600 MHz, or 2.16 GHz. In some embodiments, mapping among the given BW, the given SCS value, and the maximum number of RBs is determined according to a table. In some embodiments, when the given SCS value is 120 kHz, the given BW is 50 MHz, the maximum number of RBs is 32, or when the given SCS value is 120 kHz, the given BW is 100 MHz, the maximum number of RBs is 66, or when the given SCS value is 120 kHz, the given BW is 200 MHz, the maximum number of RBs is 132, or when the given SCS value is 120 kHz, the given BW is 400 MHz, the maximum number of RBs is 264. In some embodiments, when the given SCS value is 240 kHz, the given BW is 100 MHz, the maximum number of RBs is 33, or when the given SCS value is 240 kHz, the given BW is 200 MHz, the maximum number of RBs is 66, or when the given SCS value is 240 kHz, the given BW is 800 MHz, the maximum number of RBs is 264, or when the given SCS value is 480 kHz, the given BW is 200 MHz, the maximum number of RBs is 33.

In some embodiments, when the given SCS value is 480 kHz, the given BW is 400 MHz, the maximum number of RBs is 66, or when the given SCS value is 480 kHz, the given BW is 800 MHz, the maximum number of RBs is 132 or 133, or when the given SCS value is 480 kHz, the given BW is 1600 MHz, the maximum number of RBs is 264, 265, or 266. In some embodiments, when the given SCS value is 960 kHz, the given BW is 400 MHz, the maximum number of RBs is 33, or when the given SCS value is 960 kHz, the given BW is 800 MHz, the maximum number of RBs is 66, or when the given SCS value is 960 kHz, the given BW is 1600 MHz, the maximum number of RBs is 132, or when the given SCS value is 960 kHz, the given BW is 2.16 GHz, the maximum number of RBs is 178.

In some embodiments, the ED threshold is used to perform channel access. The ED threshold is calculated in the following. In some embodiments, the ED threshold is obtained from at least one of the followings: an initial value, a bandwidth scaling factor, a first offset, or a second offset. In some embodiments, the initial value is in dBm. In some embodiments, the initial value is pre-configured or pre-defined.

Initial Value

Example 1: the initial value is set to −47 dBm. Optionally, the initial value is set to −47 dBm−A, where A in dB is a backoff value. Optionally, the initial value is set to −47 dBm+A.

In some examples, the initial value is relevant to at least one of the followings: a power spectrum density (PSD) or a bandwidth.

Example 2: the initial value is obtained by $10*\log_{10}(PSD*BW)$, where PSD is the power spectrum density value in mW/MHz and BW is an LBT bandwidth or nominal channel bandwidth in MHz. In some examples, the PSD value is pre-defined or pre-configured. In some examples, the bandwidth is pre-configured or pre-defined.

Bandwidth Scaling Factor

In some embodiments, the bandwidth scaling factor is in dB. In some embodiments, the bandwidth scaling factor is relevant to a first bandwidth (BW1) and a second bandwidth (BW2). In some embodiments, the first bandwidth is a bandwidth of a channel in which a UE performs channel access. In some embodiments, the first bandwidth is a carrier bandwidth. In some embodiments, the first bandwidth is a bandwidth of a transmission that a UE performs in the channel. In some embodiments, the first bandwidth is configured by the base station or gNB. In some embodiments, the first bandwidth is configured in at least one of the followings: a system information, RRC message, MAC-CE or DCI. In some embodiments, the first bandwidth is a pre-defined bandwidth. In some embodiments, the second bandwidth is an LBT bandwidth. In some embodiments, the second bandwidth is a nominal channel bandwidth. In some embodiments, the second bandwidth is configured by the base station or gNB. In some embodiments, the second bandwidth is reported by the UE.

Example 3: the UE may report one or more bandwidths to the gNB, and the gNB configures one bandwidth as the second bandwidth among the reported one or more bandwidths. Optionally, the UE may report a maximum bandwidth to the gNB, and the gNB configures a bandwidth smaller or equal to the reported bandwidth.

In some embodiments, the second bandwidth is pre-defined. In some embodiments, the second bandwidth is configured in at least one of the followings: a system information, RRC message, MAC-CE or DCI. In some embodiments, the bandwidth scaling factor is relevant to the ratio between the first bandwidth and the second bandwidth.

Example 4: the bandwidth scaling factor is $$10*\log_{10}\left(\frac{BW1}{BW2}\right).$$

First Offset

In some embodiments, the first offset is a UE transmit power offset or a gNB transmit power offset. For example, the first offset is in dB, and it is a power difference between P1 and P2, where P1 is a pre-defined power value in dBm and P2 is a maximum transmit power or output power at gNB in dBm for a channel. Optionally, P2 is a maximum pre-configured or pre-defined transmit power for a UE in dBm. In some examples, the first offset is obtained from P1 and/or P2. Optionally, the first offset is pre-configured or pre-defined.

Second Offset

In some embodiments, the second offset is a processing gain offset in dB. In some embodiments, the processing gain comprises a beamforming gain, wherein the beamforming gain is relevant to a number of antennas comprising transmitter antennas and receiver antennas at gNB or at UE side.

Example 5: the second offset is obtained from a difference between G1 and G2, where G1 is a processing gain 1 and G2 is a processing gain 2. In some examples, G1 is in dBi and the value of G1 is pre-configured or pre-defined. In some examples, G2 is in dBi and the value of G2 is relevant to a beamforming gain at gNB side. Optionally, the G2 is relevant to a beamforming gain at UE side. In some examples, the beamforming gain at UE side is pre-configured by the gNB. Optionally, the beamforming gain at UE side is relevant to a number of the antennas at UE side. In some examples, the beamforming gain is obtained by $10*\log_{10}(N)$, where N is the number of antennas. In some examples, the number of antennas is pre-defined or pre-configured by the gNB. In some examples, the beamforming gain at gNB side is a maximum beamforming gain at gNB side.

Example 6: the ED threshold (EDT) is obtained by $$EDT = X - A + G1 - G2 + P1 - P2 + 10*\log_{10}\left(\frac{BW1}{BW2}\right),$$

Where X is an initial value in dBm (e.g. set to −47 dBm) and A is a backoff value in dB. Optionally, the backoff value may have the following relationship: A=max(G1-G2)+max(P1-P2), where max(G1-G2) is the maximum difference between G1 and G2; and max(P1-P2) is the maximum difference between P1 and P2.

In some examples, the ED threshold (EDT) is obtained by EDT=X. In some examples, the ED threshold (EDT) is obtained by EDT=X−A. In some examples, the ED threshold (EDT) is obtained by EDT=X+G1−G2 or EDT=X−A+G1−G2. In some examples, the ED threshold (EDT) is obtained by EDT=X+P1−P2 or EDT=X−A+P1−P2 In some examples, the ED threshold (EDT) is obtained by $$EDT = X + 10*\log_{10}\left(\frac{BW1}{BW2}\right) \text{ or } EDT = X - A + 10*\log_{10}\left(\frac{BW1}{BW2}\right).$$

In some examples, the ED threshold (EDT) is obtained by EDT=G1−G2. In some examples, the ED threshold (EDT) is obtained by EDT=P1−P2. In some examples, the ED threshold (EDT) is obtained by $$EDT = 10 * \log_{10}\left(\frac{BW1}{BW2}\right).$$

The above are only examples, some implementations can cover more examples, as long as the following is met: the ED threshold is obtained from at least one of the followings: an initial value, a bandwidth scaling factor, a first offset, or a second offset.

In some embodiments, the ED threshold is limited by a Max value and/or a Min value. In some embodiments, when the ED threshold is larger than the Max value, the ED threshold is set to the Max value. In some embodiments, when the ED threshold is smaller than the Min value, the ED threshold is set to the Min value. In some embodiments, the Max value is obtained from at least one of the followings: the initial value, the PSD value, or the bandwidth scaling factor. In some examples, the Max value is equal to the initial value. In some embodiments, the Min value is obtained from at least one of the followings: a first amount, the Max value, the initial value, the bandwidth scaling factor, or the backoff value. In some embodiments, the Min value is obtained by the maximum value minus the first amount. In some embodiments, the first amount is in dB. In some embodiments, the first amount comprises an offset. In some embodiments, the first amount is pre-configured or pre-defined.

Example 7: one example of the Min value is obtained by $$\text{Min value} = X - A + 10 * \log_{10}\left(\frac{BW1}{BW2}\right).$$

In some embodiments, the UE can support different bandwidth values. The values of the supported bandwidth is relevant to the subcarrier spacing (SCS). The SCS comprises at least one of the followings: 120 kHz, 240 kHz, 480 kHz, or 960 kHz. When a UE supports a given bandwidth for a given SCS value, the UE can be configured with a maximum number of resource blocks (RB). In a table below, we give an example of the mapping between the supported BW vs. SCS value vs. maximum configured RB in a BWP.

TABLE

| SCS/BW/RB | 50 MHz | 100 MHz | 200 MHz | 400 MHz | 800 MHz | 1600 MHz | 2.16 GHz |
|---|---|---|---|---|---|---|---|
| 120 kHz | 32 | 66 | 132 | 264 | Not applicable (N.A) | N.A | N.A |
| 240 kHz | N.A | 33 | 66 | 132 | 264 | N.A | N.A |
| 480 kHz | N.A | N.A | 33 | 66 | 132 or 133 | 264 or 265 or 266 | N.A |
| 960 kHz | N.A | N.A | N.A | 33 | 66 | 132 | 178 |

In some embodiments, a channel refers to a carrier or a part of a carrier consisting of a contiguous set of resource blocks (RBs) on which a channel access procedure is performed in shared spectrum. In some embodiments, a channel access procedure is a procedure based on sensing that evaluates the availability of a channel for performing transmissions. The basic unit for sensing is a sensing slot with a duration $T_{sl}$=9 us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

Type 1 DL channel access procedures: This describes channel access procedures to be performed by an eNB/gNB where the time duration spanned by the sensing slots that are sensed to be idle before a downlink transmission(s) is random.

Type 2 DL channel access procedures: This describes channel access procedures to be performed by an eNB/gNB where the time duration spanned by sensing slots that are sensed to be idle before a downlink transmission(s) is deterministic.

Type 2A DL channel access procedures: An eNB/gNB may transmit a DL transmission immediately after sensing the channel to be idle for at least a sensing interval $T_{short\_dl}$=25 us. $T_{short\_dl}$ consists of a duration $T_f$=16 us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

Type 2B DL channel access procedures: A gNB may transmit a DL transmission immediately after sensing the channel to be idle within a duration of $T_f$=16 us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.

Type 2C DL channel access procedures: When a gNB follows the procedures in this clause for transmission of a DL transmission, the gNB does not sense the channel before transmission of the DL transmission. The duration of the corresponding DL transmission is at most 584 us.

Uplink channel access procedures: A UE performing transmission(s) on LAA Scell(s), an eNB scheduling or configuring UL transmission(s) for a UE performing transmission(s) on LAA Scell(s), and a UE performing transmission(s) on channel(s) and a gNB scheduling or configuring UL transmission(s) for a UE performing transmissions on channel(s) shall perform the procedures for the UE to access the channel(s) on which the transmission(s) are performed. If a UE fails to access the channel(s) prior to an intended UL transmission to a gNB, Layer 1 notifies higher layers about the channel access failure.

Type 1 UL channel access procedure: This describes channel access procedures by a UE where the time duration spanned by the sensing slots that are sensed to be idle before a UL transmission(s) is random.

Type 2 UL channel access procedure: This describes channel access procedures by UE where the time duration spanned by the sensing slots that are sensed to be idle before a UL transmission(s) is deterministic.

Type 2A UL channel access procedure: If a UE is indicated to perform Type 2A UL channel access procedures, the UE uses Type 2A UL channel access procedures for a UL transmission. The UE may transmit the transmission immediately after sensing the channel to be idle for at least a sensing interval $T_{short\_ul}=25$ us. $T_{short\_ul}$ consists of a duration $T_f=16$ us immediately followed by one slot sensing slot and $T_f$ includes a sensing slot at start of $T_f$. The channel is considered to be idle for $T_{short\_ul}$ if both sensing slots of $T_{short\_ul}$ are sensed to be idle.

Type 2B UL channel access procedure: If a UE is indicated to perform Type 2B UL channel access procedures, the UE uses Type 2B UL channel access procedure for a UL transmission. The UE may transmit the transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for total of at least 5 us with at least 4 us of sensing occurring in the sensing slot.

Type 2C UL channel access procedure: If a UE is indicated to perform Type 2C UL channel access procedures for a UL transmission, the UE does not sense the channel before the transmission. The duration of the corresponding UL transmission is at most 584 us.

Commercial interests for some embodiments are as follows. 1. Solving issues in the prior art. 2. Reducing signaling overhead. 3. Providing an energy detection threshold (ED threshold or EDT) calculation. 4. Providing a good communication performance. 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in 5G NR licensed and non-licensed or shared spectrum communications. Some embodiments of the present disclosure propose technical mechanisms.

Figure 4:
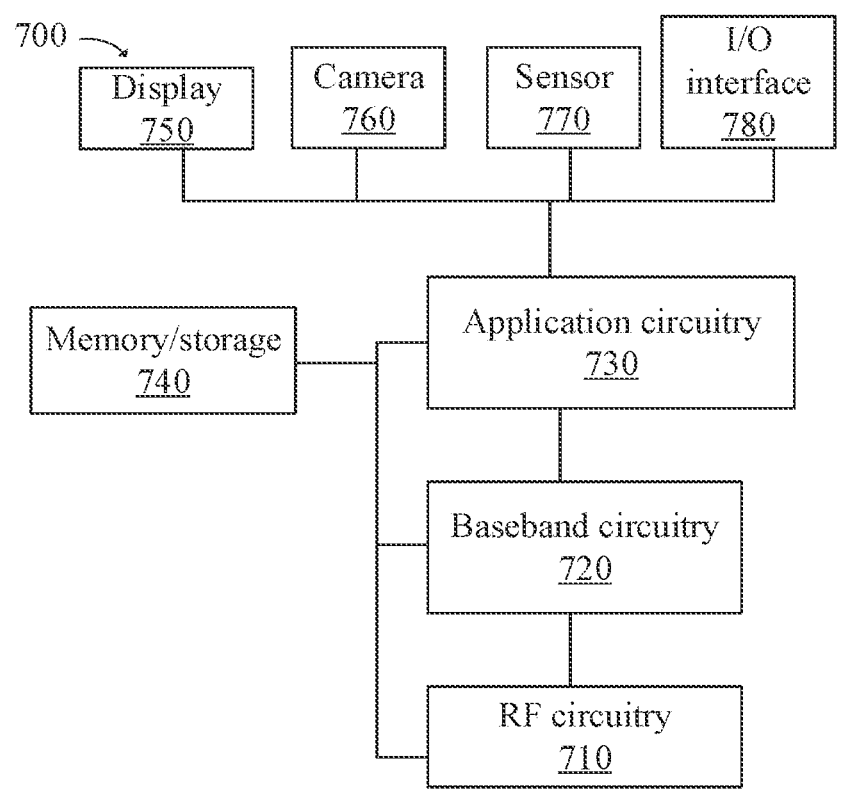
FIG. 4 is a block diagram of a system for wireless communication according to an embodiment of the present disclosure.

FIG. 4 is a block diagram of an example system 700 for wireless communication according to an embodiment of the present disclosure. Embodiments described herein may be implemented into the system using any suitably configured hardware and/or software. FIG. 4 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product.

The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method, by a user equipment (UE), comprising:
    performing, by the UE, a channel access procedure using an energy detection threshold (EDT) for a transmission, wherein the EDT is obtained from at least one of the followings: an initial value, a bandwidth (BW) scaling factor, a first offset, or a second offset,
    wherein the initial value is relevant to at least one of the followings: a power spectrum density (PSD) or a BW,
    wherein the initial value is obtained by $10*\log_{10}$(PSD*BW), where the PSD comprises a PSD value in mW/MHz and the BW comprises a listen before talk (LBT) BW or channel access BW or nominal channel BW in MHz, and wherein at least one of the following applies: the PSD value is pre-defined or pre-configured, or the BW is pre-configured or pre-defined.

2. The method of claim 1, wherein at least one of the following applies: the UE is indicated by a base station to perform the transmission, or,
    the UL channel access procedure comprises a type 2A channel access procedure, a type 2B channel access procedure, or a type 2C channel access procedure.

3. The method of claim 1, wherein the initial value is in dBm, the initial value being pre-configured or pre-defined, and wherein the initial value is set to a first value or the initial value is set to a first value plus or minus a backoff value.

4. The method of claim 3, wherein the first value is equal to −47 dBm and the backoff value is in dB.

5. A wireless communication method, by a base station, comprising:
    performing, by the base station, a channel access procedure using an energy detection threshold (EDT) for a transmission, wherein the EDT is obtained from at least one of the followings:
    an initial value, a bandwidth (BW) scaling factor, a first offset, or a second offset,
    wherein the initial value is relevant to at least one of the followings: a power spectrum density (PSD) or a BW,
    wherein the initial value is obtained by $10*\log_{10}$(PSD*BW), where the PSD comprises a PSD value in mW/MHz and the BW comprises a listen before talk (LBT) BW or channel access BW or nominal channel BW in MHz, and wherein at least one of the following applies: the PSD value is pre-defined or pre-configured, or the BW is pre-configured or pre-defined.

6. The method of claim 5, wherein the BW scaling factor is in dB, and the BW scaling factor is relevant to a first BW and a second BW.

7. The method of claim 6, wherein the first BW is a BW of a channel in which the UE performs channel access, a carrier BW, or a BW of a transmission that the UE performs in the channel,
wherein the first BW is configured by the base station or configured in at least one of the followings: a system information, a radio resource control (RRC) message, a medium access control (MAC) control element (CE), or a downlink control information (DCI), and
wherein the first BW is a pre-defined BW.

8. The method of claim 6, wherein at least one of the following applies: the second BW is an LBT BW or a nominal channel BW, or the second BW is configured by the base station or reported by the UE.

9. The method of claim 8, wherein at least one of the following applies: the base station is configured to receive one or more BWs from the UE, and the base station is configured to configure one BW as the second BW among the reported one or more BWs from the UE; or,
the base station is configured to receive a maximum BW from the UE, and the base station is configured to configure a BW smaller or equal to the reported maximum BW.

10. The method of claim 6, wherein the second BW is configured by the base station or configured in at least one of the followings: a system information, a radio resource control (RRC) message, a medium access control (MAC) control element (CE), or a downlink control information (DCI).

11. The method of claim 10, wherein the BW scaling factor is equal to $$10 * \log_{10}\left(\frac{BW1}{BW2}\right),$$

where BW1 is the first BW, and BW2 is the second BW.

12. A user equipment (UE), comprising:
a memory;
a transceiver; and
a processor coupled to the memory and the transceiver;
wherein the processor is configured to perform a channel access procedure using an energy detection threshold (EDT) for the transmission, wherein the EDT is obtained from at least one of the followings: an initial value, a bandwidth (BW) scaling factor, a first offset, or a second offset,
wherein the initial value is relevant to at least one of the followings: a power spectrum density (PSD) or a BW,
wherein the initial value is obtained by $10*\log_{10}$ (PSD*BW), where the PSD comprises a PSD value in mW/MHz and the BW comprises a listen before talk (LBT) BW or channel access BW or nominal channel BW in MHz, and wherein at least one of the following applies: the PSD value is pre-defined or pre-configured, or the BW is pre-configured or pre-defined.

13. The UE of claim 12, wherein the first offset is a transmit power offset of the UE or a transmit power offset of the base station, the first offset is in dB, and the first offset is obtained from P1 and/or P2, where P1 is a pre-defined power value in dBm and P2 is a maximum transmit power or output power at the base station in dBm for a channel or P2 is a maximum pre-configured or pre-defined transmit power for the UE in dBm.

14. The UE of claim 12, wherein the second offset is obtained from G1 and/or G2, where G1 is a first processing gain and G2 is a second processing gain,
wherein the second offset is obtained from a difference between G1 and G2 G1 is in dBi and a value of G1 is pre-configured or pre-defined, and G2 is in dBi and a value of G2 is relevant to a beamforming gain at the base station or the UE.

15. The UE of claim 14, wherein $$EDT = X - A + G1 - G2 + P1 - P2 + 10*\log_{10}\left(\frac{BW1}{BW2}\right),$$

where X is the first value in dBm and A is the backoff value in dB, X-A is the initial value,
wherein the backoff value has the following relationship: A=max(G1−G2)+max(P1−P2), where max(G1−G2) is the maximum difference between G1 and G2, and max(P1−P2) is the maximum difference between P1 and P2, and
wherein the EDT is limited by a maximum value and/or a minimum value, and $$\text{Min value} = X - A + 10*\log_{10}\left(\frac{BW1}{BW2}\right).$$

16. A base station, comprising:
a memory;
a transceiver; and
a processor coupled to the memory and the transceiver;
wherein the processor is configured to perform a channel access procedure using an energy detection threshold (EDT) for a transmission, wherein the EDT is obtained from at least one of the followings: an initial value, a bandwidth (BW) scaling factor, a first offset, or a second offset,
wherein the initial value is relevant to at least one of the followings: a power spectrum density (PSD) or a BW,
wherein the initial value is obtained by $10*\log_{10}$ (PSD*BW), where the PSD comprises a PSD value in mW/MHz and the BW comprises a listen before talk (LBT) BW or channel access BW or nominal channel BW in MHz, and wherein at least one of the following applies: the PSD value is pre-defined or pre-configured, or the BW is pre-configured or pre-defined.

17. The base station of claim 16, wherein a user equipment (UE) supports different BW values,
wherein the BW values are relevant to a subcarrier spacing (SCS), and
wherein the SCS comprises at least one of the followings: 120 kHz, 240 kHz, 480 kHz, or 960 kHz.

18. The base station of claim 17, wherein when the UE supports a given BW for a given SCS value, the UE is configured with a maximum number of resource blocks (RBs) in a BWP.

19. The base station of claim 18, wherein when the given SCS value is 120 kHz, the given BW is 50 MHz, the maximum number of RBs is 32, or when the given SCS value is 120 kHz, the given BW is 100 MHz, the maximum number of RBs is 66, or when the given SCS value is 120 kHz, the given BW is 200 MHz, the maximum number of RBs is 132, or when the given SCS value is 120 kHz, the given BW is 400 MHz, the maximum number of RBs is 264;

when the given SCS value is 240 kHz, the given BW is 100 MHz, the maximum number of RBs is 33, or when the given SCS value is 240 kHz, the given BW is 200 MHz, the maximum number of RBs is 66, or when the given SCS value is 240 kHz, the given BW is 800 MHz, the maximum number of RBs is 264, or when the given SCS value is 480 kHz, the given BW is 200 MHz, the maximum number of RBs is 33;

when the given SCS value is 480 kHz, the given BW is 400 MHz, the maximum number of RBs is 66, or when the given SCS value is 480 kHz, the given BW is 800 MHz, the maximum number of RBs is 132 or 133, or when the given SCS value is 480 kHz, the given BW is 1600 MHz, the maximum number of RBs is 264, 265, or 266; and when the given SCS value is 960 kHz, the given BW is 400 MHz, the maximum number of RBs is 33, or when the given SCS value is 960 kHz, the given BW is 800 MHz, the maximum number of RBs is 66, or when the given SCS value is 960 kHz, the given BW is 1600 MHz, the maximum number of RBs is 132, or when the given SCS value is 960 kHz, the given BW is 2.16 GHz, the maximum number of RBs is 178.

* * * * *